US011392350B2

(12) United States Patent
Steele, Jr.

(10) Patent No.: US 11,392,350 B2
(45) Date of Patent: Jul. 19, 2022

(54) PARALLEL GENERATION OF PSEUDORANDOM NUMBER SEQUENCES USING MULTIPLE GENERATORS WITH BRINED INITIAL STATES

(71) Applicant: Oracle International Corporation, Redwood Shores, CA (US)

(72) Inventor: Guy L. Steele, Jr., Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 330 days.

(21) Appl. No.: 16/548,076

(22) Filed: Aug. 22, 2019

(65) Prior Publication Data

US 2020/0401378 A1 Dec. 24, 2020

Related U.S. Application Data

(60) Provisional application No. 62/862,905, filed on Jun. 18, 2019.

(51) Int. Cl.
*G06F 9/48* (2006.01)
*H04L 9/14* (2006.01)
(Continued)

(52) U.S. Cl.
CPC ............ *G06F 7/586* (2013.01); *G06F 9/3885* (2013.01); *G06F 9/48* (2013.01); *G06F 7/584* (2013.01); *G06F 7/588* (2013.01); *G06F 9/4881* (2013.01); *G06F 9/526* (2013.01); *G06F 9/54* (2013.01); *H04L 9/0656* (2013.01); *H04L 9/0662* (2013.01); *H04L 9/0668* (2013.01); *H04L 9/0841* (2013.01); *H04L 9/3247* (2013.01)

(58) Field of Classification Search
CPC . G06F 7/586; G06F 7/58; G06F 7/592; G06F 7/584; G06F 7/588; G06F 9/3885;
(Continued)

(56) References Cited

U.S. PATENT DOCUMENTS 5,943,248 A 8/1999 Clapp
9,705,854 B2 * 7/2017 Khazan ................. G06F 21/602
(Continued)

OTHER PUBLICATIONS

Kawther Esaa Abdullah et al., Security Improvement in Elliptic Curve Cryptography, 2018, [Retrieved on Jan. 18, 2022], Retrieved from the internet: <URL: https://pdfs.semanticscholar.org/7664/6a07b3ef4f996af8532ceb59431061332636.pdf> 10 Pages (122-131 ) (Year: 2018).*
(Continued)

*Primary Examiner* — Anibal Rivera
(74) *Attorney, Agent, or Firm* — Hickman Becker Bingham Ledesma LLP

(57) ABSTRACT

Embodiments comprise construction of a collection of pseudorandom number generators (PRNGs), with either a known or unknown cardinality, using unique brine values that comprise a salt value for the collection and also different index values for each PRNG for the collection. The additive parameters of such PRNGs are based on the respective brine values of the PRNGs, thereby ensuring that the PRNGs in the collection have different state cycles. Embodiments make it likely that PRNGs from different collections have distinct additive parameters by choosing a pseudorandom salt value for each collection. According to embodiments, a stream of generators in a collection is created by a spliterator that carries a salt value for the collection and combines the salt value with index values for the generators to produce brined additive parameters for the PRNGs in the stream. According to embodiments, such a stream may be executed by multiple threads in parallel.

22 Claims, 3 Drawing Sheets

(51) Int. Cl.
*H04L 9/18* (2006.01)
*G06F 7/58* (2006.01)
*G06F 9/38* (2018.01)
*H04L 9/08* (2006.01)
*G06F 9/52* (2006.01)
*H04L 9/06* (2006.01)
*H04L 9/32* (2006.01)
*G06F 9/54* (2006.01)

(58) Field of Classification Search
CPC ... G06F 9/48; G06F 7/582; G06F 9/54; G06F 9/52; G06F 9/524; G06F 9/4881; G06F 9/5027; G06F 9/526; G06F 9/505; G06F 9/544; H04L 9/0662; H04L 9/0656; H04L 9/0668; H04L 9/0866; H04L 9/0877; H04L 9/0897; H04L 9/3236; H04L 9/3263; H04L 9/0894; H04L 9/088; H04L 9/085; H04L 9/0841; H04L 9/0643; H04L 9/083; H04L 9/3242; H04L 9/3247
See application file for complete search history.

(56) References Cited

U.S. PATENT DOCUMENTS

| | | | |
|---|---|---|---|
| 2009/0292751 | A1 | 11/2009 | Schneider |
| 2013/0129088 | A1 | 5/2013 | Maranon |
| 2014/0010371 | A1* | 1/2014 | Khazan ............... H04L 9/0894 380/278 |
| 2015/0095389 | A1 | 4/2015 | Steele |
| 2015/0110273 | A1* | 4/2015 | Ponceleon ............. H04L 9/14 380/277 |
| 2017/0102922 | A1 | 4/2017 | Steele, Jr. |
| 2020/0358764 | A1* | 11/2020 | Hojilla Uy ........... H04L 9/3263 |
| 2020/0366653 | A1* | 11/2020 | Caceres ............ H04L 63/0853 |

OTHER PUBLICATIONS

Adam W. Montville, Random Number Generation on Handheld Devices for Cryptographic Applications, May 21, 2003, [Retrieved on Jan. 18, 2022], Retrieved from the internet: <URL: https://ir.library.oregonstate.edu/concern/graduate_thesis_or_dissertations/k35697403> 75 Pages (1-68) (Year: 2003).*
Steele Jr. U.S. Appl. No. 14/880,798, filed Oct. 12, 2015, Office Action, dated Jul. 28, 2020.
Mascagni et al., "Algorithm 806: SPRNG: A Scalable Library for Pseudorandom Number Generation", ACM, dated 2001, 26 pages.
Claessen et al., "Splittable Pseudorandom Number Generators Using Cryptographic Hasing", dated Sep. 2013, 12 pages.
David Stafford, "Better Bit Mixing—Improving on MurmurHash3's 64-bit Finalizer", Twiddling the Bits, dated Sep. 2015, 4 pages.
Empirical Testing of Random Number Generators, "TestU01", dated Aug. 2009., 2 pages.
GPU Implementation of Scalable Non-Linear Congruential Generator for Cryptography Applications, Aditya Belsare et al. BLSVSI dated 2013, Paris France.
Guy L. Steele Jr. et al., "Fast Splittable Pseudorandom Number Generators", AMC, OOPSLA'14, Oct. 20-24, 2014, 20 pages.
HotBits: Genuine Random Numbers, "Hot Bits: Genuine random numbers, generated by radioactive decay", dated Sep. 2006, 2 pages.
L'ecuyer et al., "An Object-Oriented Random-Number Package With Many Long Streams and Substreams", 2002 Informs vol. 50, No. 6, Nov.-Dec. 2002, 3 pages.
L'ecuyer, Pierre, "Efficient and Portable Combined Random Number Generators", AMC, vol. 31, No. 6, dated Jun. 1988, 9 pages.

Leiserson et al., "Deterministic Parallel Random-Number Generation for Dynamic-Multithreading Platforms", Copyright © 2012 ACM, 12 pages.
Carmon et al., "Good Parameters and Implementations for Combined Multiple Recursive Random Number Generators", dated Jan. 1999, Operations Research, 8 pages.
Marsaglia et al., "Some difficult-to-pass tests of randomness", dated 2002, 3 pages.
Schaathun et al., "Evaluation of Splittable Pseudo-Random Generators", dated May 12, 2015, 20 pages.
Matsumoto et al., "Mersenne Twister: A 623-Dimensionally Equidistributed Uniform Pseudo-Random Number Generator", ACM Modeling and Computer Simulation, vol. 8, No. 1, Jan. 1998, pp. 3-30.
Melissa E. O'Neill, "PCG: A Family of Simple Fast Space-Efficient Statistically Good Algorithms for Random Number Generation", ACM Mathematical Software, vol. V, No. N, last viewed Sep. 30, 2015, 46 pgs.
Merriam, Webster, "Independent", www.merriam-webster.com, dated Jul. 10, 2014, web archive.
MurmurHash3—smhasher—MurmurHash3 information and brief perfomance results—Test your hash functions.—Google Project Hosting, dated Sep. 2015, 7 pages.
Pierre L'ecuyer, "Tables of Linear Congruential Generators of Different Sizes and Good Lattice Structure", Mathematics of Computation vol. 68, No. 225, Jan. 1999, pp. 249-260.
Pierre L'ecuyer, "TestU01: A C Library for Empirical Testing of Random Number Generators", ACM Transactions on Mathematical Software, vol. 33, No. 4, Article 22, Publication date: Aug. 2007. 40 pgs.
PractRand, "(Practically Random) is a C++ library of pseudorandom number generators (PRNGs, or just RNGs) and statistical tests for RNGs", version 0.92, dated Sep. 2015, 6 pages.
Robert G. Brown's General Tools Page, "Dieharder", Version 3.31.1, dated 2015, 9 pages.
Rukhin et al., "A Statistical Test Suite for Random and Pseudorandom Number Generators for Cryptographic Applications", dated Apr. 2010, 131 pages.
Lennart Augustsson, "Off-topic, but question about history", dated Aug. 30, 2013, 1 page.
J. Hennessy et etl., "Computer Architecture: A Quantitative Approach", Elsevier, 3rd edition, dated 2014, 15 pages.
D.Patterson et al., "Computer Orgnization and Design, the Hardware/Software interface", Elsevier, 4th edition revised printing, dated 2012, 5 pages.
Steele, U.S. Appl. No. 14/880,798, filed Oct. 12, 2015, Office Action, dated Jan. 29, 2018.
Steele, Jr, U.S. Appl. No. 14/880,798, filed Oct. 12, 2015, Advisory Action, dated Nov. 30, 2017.
Steele Jr., U.S. Appl. No. 14/880,798, filed Oct. 12, 2015, Office Action, dated Mar. 30, 2017.
Steele Jr., U.S. Appl. No. 14/880,798, filed Oct. 12, 2015, Final Office Action, dated Jul. 13, 2018.
Steele Jr., U.S. Appl. No. 14/880,798, filed Oct. 12, 2015, Examiners Answers, dated Feb. 26, 2019.
Steele Jr. U.S. Appl. No. 14/880,798, filed Oct. 12, 2015, Final Office Action, dated Sep. 7, 2017.
Steele Jr, U.S. Appl. No. 14/880,798, filed Oct. 12, 2015, Interview Summary, dated Nov. 13, 2017.
Steele Jr, U.S. Appl. No. 14/880,798, filed Oct. 12, 2015, Adviosry Action, dated Sep. 5, 2018.
Sebastino Vigna, "xoshiro / xoroshiro generators and the PRNG shootout", https://prng.di.unimi.it/, 2019, accessed on Oct. 22, 2021, 5 pgs.
Sebastino Vigna, "An experimental exploration of Marsaglia's xorshift generators, scrambled", ACM Trans. Math. Softw., vol. 42 Issue. 4:30:1-30:23, Jun. 2016, 23 pages.

* cited by examiner

US 11,392,350 B2

PARALLEL GENERATION OF PSEUDORANDOM NUMBER SEQUENCES USING MULTIPLE GENERATORS WITH BRINED INITIAL STATES

CROSS-REFERENCE TO RELATED APPLICATIONS; BENEFIT CLAIM

This application claims the benefit of Provisional Appln. 62/862,905, filed Jun. 18, 2019, the entire contents of which is hereby incorporated by reference as if fully set forth herein, under 35 U.S.C. § 119(e).

Further, this application is related to the following, the entire contents of each of which is hereby incorporated by reference as if fully set forth herein:
- U.S. application Ser. No. 14/880,798, titled "Generating Pseudorandom Number Sequences by Nonlinear Mixing of Multiple Subsidiary Pseudorandom Number Generators", filed Oct. 12, 2015; and
- U.S. application Ser. No. 14/043,372, titled "Method and system for generating pseudorandom numbers in parallel", filed Oct. 1, 2013.

FIELD OF THE INVENTION

The invention relates to pseudorandom number generators, and, more specifically, to computational techniques for generating a set, sequence, or stream of pseudorandom numbers with good statistical qualities using splittable pseudorandom number generators.

BACKGROUND

Many computational algorithms and applications rely on a source of pseudorandom numbers or bit strings, that is, a deterministic algorithm, device, process, or method that supplies a set, sequence, or stream of numbers or bit strings that for appropriate purposes appear to have been, or behave as if, generated by a truly random source. One class of applications that makes use of pseudorandom numbers are the so-called "Monte Carlo" methods. Another class of applications that makes use of pseudorandom numbers are Markov chains.

The quality of a source of pseudorandom numbers may be judged by applying any of a variety of statistical tests to its output. One widely used test is the DieHarder software suite [3]. One of the more stringent tests in that suite is due to Marsaglia and Tsang [13]. Another is a statistical test suite from NIST [15]. Perhaps the best-known today is TestU01 [16, 10], including its most stringent set of tests, known as BigCrush. Another modern test suite, less widely known, is PractRand [5].

There is a large amount of literature on sequential algorithms for generating pseudorandom number sequences. One sequential algorithm that is widely considered to be of very high quality is the Mersenne twister [14]. It is also possible to generate "genuinely" random numbers by using the results of a physical process that is believed to have random behavior. One source of such bits, available on the Internet, is the "HotBits" generator [20].

There is a close relationship between the generation of pseudorandom numbers and the generation of hash values for data structures. In particular, a stream of pseudorandom numbers can, in principle, be generated by applying an appropriate hashing function to a stream of successive integers. Some hash functions are constructed by first reducing a large data structure to an integer of fixed size and then applying a finalizer, which may be a mixing function that "mixes" the values of the individual bits used to represent the integer. One example of this approach is the MurmurHash3 algorithm [1], which uses a 64-bit finalizer when generating a 64-bit hash. Variations of this 64-bit finalizer function are discussed by Stafford [17]. Each of these finalizer functions takes a 64-bit input and produces a 64-bit result. Each of these functions is bijective: distinct inputs produce distinct results. Each of these functions also has good avalanche statistics, meaning that, on average over all possible inputs, changing just one bit of the input has, for each of the 64 output bits, a roughly 50% chance of changing that output bit. Both the MurmurHash3 mixing function and the Stafford variants achieve mixing by applying an alternating series of xorshift steps and multiplication steps; an xorshift step transforms an input value z into z XOR (z SHIFTRIGHT k)) for some integer shift distance k, whereas a multiplication step transforms an input value z into z×a for some multiplier a. The intuition behind these kinds of steps is that an xorshift step uses information in the high-order bits to modify the low-order bits, while a multiplication step uses information in the low-order bits to modify the high-order bits. In other words, in an xorshift step, information flows from left to right, whereas, in a multiplication step, information flows from right to left. Thus, alternating such steps can achieve good mixing by getting information to slosh back and forth within the word, so that eventually every input bit can influence every output bit.

Sequential algorithms generally do not produce pseudorandom numbers with desirable statistical properties when being run in parallel. Thus, a more difficult problem than generating a sequence of pseudorandom numbers by a sequential method is to provide a deterministic algorithm, device, process, or method that can be used by multiple shared threads of control that execute in parallel, in such a manner that each thread can independently generate a sequence of pseudorandom numbers and yet the single set of numbers generated by all of the threads collectively still has good statistical properties. It is desirable to have such a deterministic algorithm, device, process, or method when using parallel processing hardware, such as central processing unit (CPU) clusters, to carry out the computations for an application such as a Monte Carlo simulation. It is also desirable to have such a deterministic algorithm, device, process, or method when using vector processing or SIMD hardware, such as one or more graphic processing units (GPUs), to carry out computations of that class.

The Java programming language has from its beginning included a class java.util.Random whose instances are objects that provide, among others, a nextLong( )method that, when called, repeatedly produces a stream of pseudorandom values. Over the years some drawbacks in its design became apparent. First, it has a relatively small period ($2^{48}$). Second, its output fails the DieHarder tests; in other words, java.util.Random is not a very good generator of pseudorandom numbers by today's standards. Third, while its methods are threadsafe, it has poor performance when shared by many threads. Fourth, if a programmer tries to sidestep the third drawback by creating a fresh random number generator object for each thread, there is no guarantee that this strategy will produce a collective set of pseudorandom values that is statistically as good as a set of values produced by a single random number generator object. Java 7 introduced a new class java.util.concurrent.ThreadLocalRandom to address the third drawback. However, it used the same underlying mathematical algorithm as java.util.Random, so it still suffered from the first, second, and fourth drawbacks.

The implementation of java.util.concurrent.ThreadLocalRandom was inspired, in part, by work done by Leiserson, Schardl, and Sukha [12], in which they describe an algorithm that they call DOTMIX. DOTMIX allows computational tasks running in parallel to generate pseudorandom sequences independently. In the model described by Leiserson, Schardl, and Sukha, a computation initially consists of a single task, and any task may at any time either spawn a new task, synchronize with tasks it has spawned (waiting for them to complete), or generate a pseudorandom number. The basic idea is that each such action (spawn, sync, or generate) is associated with a unique "pedigree", which is an ordered vector of integers. Computations occur at each spawn, sync, or generate operation to ensure that every action, within the set of all actions performed by all tasks, will have a distinct pedigree. Additionally, the generate operation produces a pseudorandom number by performing a two-part mathematical computation on the pedigree of the generate operation: a dot product with a vector of coefficients, followed by a "mixing" operation that conceptually "scrambles" the result of the dot product. The name "DOTMIX" comes from this two part-process of a dot product followed by a mix function. The vector of coefficients is drawn from a fixed table that is defined, ideally by some truly random process, before execution of the initial task begins. Note that a dot product is a linear function that, when the vector of coefficients is regarded as fixed, combines the elements of the pedigree linearly.

Steele, Lea, and Flood [7] describe a distantly related algorithm they call SPLITMIX, which also allows computational tasks running in parallel to generate pseudorandom sequences independently. However, the algorithm is not specifically tied to the parallel task structure, or to actions such as spawn and sync. Rather, it is object-oriented: each pseudorandom number generator (PRNG) object contains some state and supports at least two methods, generate and split. The generate method advances the internal state of the object and returns a pseudorandom value (typically a 64-bit integer); the split method advances the internal state of the object and returns a newly created PRNG object. The paper provides some mathematical justification, based on that supplied by Leiserson, Schardl, and Sukha, for why the outputs of the two objects are likely to be statistically independent. The version of SPLITMIX adopted for use in JDK8 for class SplittableRandom (version 8 of the Java Development Kit) uses 127 bits of internal state per object, in the form of two 64-bit integers, one of which is required to be odd. For some purposes this may be an adequate amount of internal state, but for other purposes, 127 bits of internal state may not provide sufficiently strong guarantees of statistical independence.

L'Ecuyer [9] presents tables that describe, for a variety of computer word sizes, constants a that, when used to construct a linear congruential generator, produce generators with particularly good figures of merit based on the structure of a lattice of points determined by the output of the generator. In particular, the values a=3202034522624059733 and a=3935559000370003845 are listed as suitable for use in a generator of the form x'=ax+c mod $2^{64}$ for any odd c, and the value a=2685821657736338717 is listed as suitable for use in a generator of the form x'=ax mod $2^{64}$.

L'Ecuyer [8, FIG. 3] describes a way to create a PRNG of good quality and very long period by combining two or more multiplicative linear congruential generators (MLCGs), and remarks that the period of the combined generator can be "split" (partitioned) into separate sections easily because each of the underlying generators can be so partitioned. However, the splitting needs to be "pre-planned" rather than performed on demand by any thread at any time. The technique combines the two or more MLCGs linearly; for each pseudorandom value to be generated overall, the technique uses each MLCG to generate a value, then computes the sum of those generated values modulo some fixed integer m. The result is a pseudorandomly chosen nonnegative value that is less than m.

In the mid-1990s, Augustsson [2] implemented L'Ecuyer's algorithm in purely functional form as part of the Haskell standard library System.Random; the code now in that library, dated 2001, contains a kernel with two functions stdNext and stdSplit. The implementation of stdNext is a faithful rendition of L'Ecuyer's algorithm [8, FIG. 3], but the stdSplit method does not split the period in the manner suggested by L'Ecuyer; instead, it uses an ad hoc on-demand method that, by its own admission, has "no statistical foundation," but is not that different in structure from SPLITMIX except that it fails to try to compute "random" values for initializing newly generated objects.

Claessen and Palka [4] remark on an application that exposes a severe defect of the stdSplit function in the Haskell standard library System. Random, then describe a superior implementation of the same purely functional API that is similar in spirit to DOTMIX: it generates pseudorandom values by encoding the path in the split tree as a sequence of numbers, and then applies a cryptographically strong hash function. Their path encoding and hash function are designed to allow successive pseudorandom values to be computed incrementally in constant time, independent of the path length.

L'Ecuyer et al. [11] describe an object-oriented C++ PRNG package RngStream that supports repeatedly splitting its very long period (approximately $2^{191}$) into streams and sub streams. This package uses a combined multiple recursive generator known as MRG32k3a [6] in which the outputs of two smaller generators are added together. The periods of the two smaller generators are $(m_1^3-1)$ and $(m_2^3-1)$ where $m_1$ and $m_2$ are distinct prime numbers chosen so that $(m_1-1)/2$ and $(m_2-1)/2$ are relatively prime. As a result, the period of the overall generator is $(m_1^3-1)(m_2^3-1)/2$, which is one-half the product of the periods of the smaller generators. In fact, $m_1=4294967087=2^{32}-209$ and $m_2=4294944443=2^{32}-22853$, so that the period is approximately $2^{191}$. Given one instance of this sort of generator, there is a procedure for "jumping" forward along the state cycle by a great distance, such as $2^{76}$ or $2^{127}$. Indeed, by starting from a specific state, one can repeatedly jump forward by $2^{127}$ to obtain a set of "stream start states"; then from each such state one can repeatedly jump forward by $2^{76}$ to obtain a set of "substream start states". Under the very reasonable pragmatic assumption that an application will require no more than $2^{60}$ streams, no more than $2^{51}$ substreams from each stream, and no more than $2^{76}$ values from each substream, this approach guarantees that the parts of the state cycle traversed by the substreams will not overlap.

Vigna et al. [18, 19] discuss and analyze a variety of designs for xorshift generators, specific instances of which have names such as xoroshiro128, xoroshiro128+ and xoshiro256.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
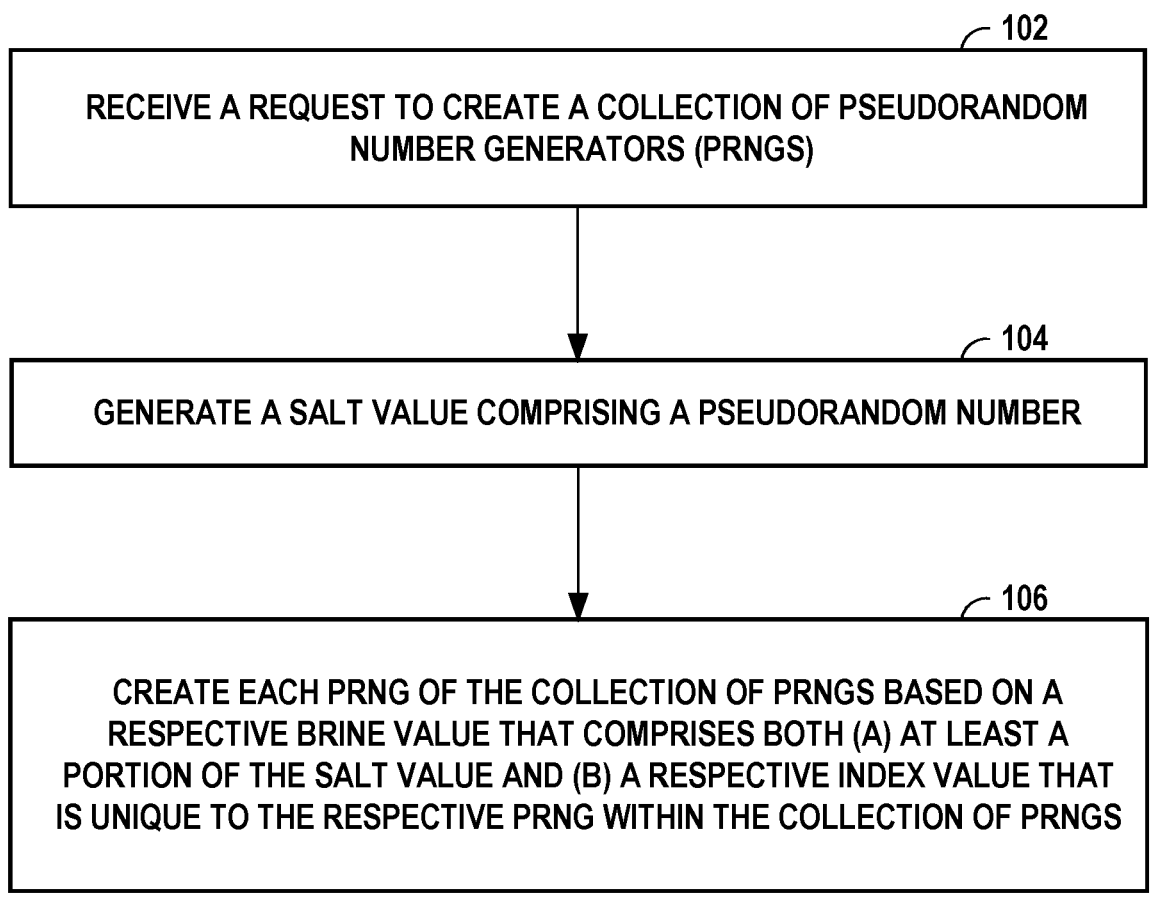
FIG. 1 depicts a flowchart for generating a pseudorandom number by nonlinearly combining two or more component pseudorandom numbers generated from two or more subsidiary pseudorandom number generators.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The S<small>PLIT</small>M<small>IX</small> algorithm used in JDK8 for class SplittableRandom is highly satisfactory for many purposes, but has three possible drawbacks: (a) its state space is 127 bits, which may be on the small side for large-scale applications, (b) the period (state cycle length) for any single instance is only $2^{64}$, and (c) it does have some known statistical weaknesses, even for the case of a single instance (though the probability of stumbling across them is low).

In the T<small>WO</small>LCG algorithm, the outputs of two linear congruential generators (LCGs) are combined using a nonlinear mixing function. This doubles the state space to 254 bits and is approximately the same speed, but the period for any instance is still at most $2^{64}$, and it is not clear whether the period for any instance is always $2^{64}$ (it might be smaller).

Both S<small>PLIT</small>M<small>IX</small> and T<small>WO</small>LCG make it unlikely that two distinct instances will have identical state cycles, and even if they do, they will likely traverse different parts of the state cycle. However, if they do traverse the same (or overlapping) parts of the state cycle, the result will be extremely undesirable correlations between what ought to be statistically independent sequences. It is desirable to provide a way to guarantee that, within a specific set or collection of instances, no two will ever have the same state cycle.

Embodiments provide such a guarantee for a set or collection of instances that are created "all at the same time"; furthermore it also behaves like S<small>PLIT</small>M<small>IX</small> and T<small>WO</small>LCG, making it unlikely that two distinct instances created independently, or as part of two distinct collections, will have the same state cycle.

In an embodiment, an instance of a pseudorandom number generator comprises one linear congruential generator ("L"), one xorshift generator ("X"), and a mixing function ("M"). Each output of the overall "LXM" pseudorandom number generator is computed by taking one output from the linear congruential generator (LCG) and one output from the xorshift generator, and then passing their sum through the mixing function (which might be a hashing operation such as the MurmurHash3 finalizer, or perhaps simply the identity function, that is, no operation). The LCG has an additive parameter a; instances with distinct additive parameters will necessarily have distinct state cycles.

According to embodiments, the size of the state space of the LCG and the size of the state space of the xorshift generator may be chosen independently. An LCG with m state bits will have a period of $2^m$; an xorshift with n state bits will have a period of $2^n-1$. Because $2^m$ and $2^n-1$ are relatively prime, the period of the combined LXM generator will be their product, that is, $2^m(2^n-1)$. Depending on target architecture, reasonable choices for m may be 32, 64, and 128, and reasonable choices for n may be 64, 128, 256, 512, and 1024.

Embodiments use a novel approach to the construction of a collection of such LXM generators. Note that over the course of the execution of a program that utilizes pseudorandom number generators, many such collections may be created, or perhaps just one such collection. Moreover, the eventual total size of a collection may or may not be known when creation of a collection commences. Embodiments guarantee that distinct generators within the same collection have distinct additive parameters by giving each generator in a given collection a distinct integer index. Embodiments further make it highly likely that generators in two different collections have distinct additive parameters (even though they may happen to have the same integer index within their respective collections) by also choosing a pseudorandom "salt" value for each collection. The additive parameter for a given generator is computed from its index and the salt value for its collection. Embodiments employ a novel technique for combining index and salt so as to use as much salt as possible for each index; such a combined value is referred to herein as "brine".

There is evidence that two PRNGs having different additive parameters will produce statistically-independent pseudorandom numbers. Specifically, different additive parameters cause the respective PRNGs to have different periodic state cycles. Thus, embodiments produce a PRNG that has good statistical properties when compared with itself, with other PRNGs in the same collection, or with other PRNGs running in parallel that may be from another collection. As such, benefits of embodiments include a significantly smaller probability (than that afforded by S<small>PLIT</small>M<small>IX</small>) of statistical correlations among multiple generators being used by parallel tasks, and a guarantee that the state cycles are different for each PRNG in a collection of generators created by a single invocation of the splits operation.

As described in detail herein, embodiments provide a deterministic algorithm, device, process, and/or method that can be used by multiple shared threads of control, in a computer processor, that execute in parallel. Specifically, each thread can independently use a PRNG to generate a sequence of pseudorandom numbers and yet the single set of numbers generated by all of the threads collectively still has good statistical properties. In fact, embodiments generate a collection of PRNGs, based on a common salt value, such that each PRNG in the collection also has good statistical properties. Such good statistical properties include the outputs of each individual PRNG, the outputs of the PRNGs in a given collection, and the outputs of PRNGs from different collections comprise pseudorandom numbers that are either guaranteed to be, or are highly likely to be, statistically independent.

For example, based on utilization of brine values within a collection of PRNGs, embodiments guarantee distinct initial values for each PRNG of the collection of PRNGs. Because there is strong evidence that PRNGs that are initialized with distinct initial values produce statistically-independent pseudorandom numbers, embodiments ensure that pseudorandom numbers being produced by a collection of PRNGs are statistically independent, even when the PRNGs are run in parallel using parallel processing hardware, such as central processing unit (CPU) clusters. Such statistically-independent pseudorandom numbers, being generated in parallel, are particularly useful for algorithms, such as a Monte Carlo simulation, that heavily rely on pseudorandom numbers being processed in parallel. Furthermore, embodiments are beneficial when using vector processing or SIMD hardware, such as one or more graphic processing units (GPUs), to carry out computations of that class.

Furthermore, it is likely that PRNGs generated in different collections will also produce statistically-independent pseudorandom numbers. Specifically, the brine values utilized to create the PRNGs, according to embodiments, include a portion of a pseudorandom salt value, which increases the likelihood that pseudorandom numbers generated by two PRNGs from different collections will generate pseudorandom numbers that are statistically independent. Embodiments described herein are approximately as fast as SplitMix and appear to have none of its weaknesses. Further, embodiments provide much stronger guarantees of the statistical independence of multiple generators when collections of generators are created all at once.

A Brined Splittable Pseudorandom Number Generator

Embodiments generate pseudorandom values by using a plurality of subgenerators, of which at least one has a parameter that selects from a family of algorithms, and combining their outputs. After their outputs have been combined, a mixing function may then be applied. Embodiments also provide support for an on-demand split method in the style of the SPLITMIX algorithm, which creates one new generator, and for a second on-demand splits method that creates a collection of new generators.

One embodiment uses 255 bits of internal state in the form of four 64-bit integers, one of which is required to be odd. The four 64-bit integers are referred to herein as a, s, x0, and x1; a must be odd, and furthermore it must be the case that at least one of x0 and x1 is nonzero. Once values have been chosen for a, s, x0, and x1 for any instance of the PRNG, s, x0, and x1 represent mutable state that may be altered whenever a generate or split or splits operation is performed, but a, once chosen, is unchanging for that instance. Thus, one may regard PRNG instances as members of a family of PRNGs, where each instance has 192 bits of state (s, x0, and x1) and furthermore is parameterized by an additional 63 bits of information (the 63 high-order bits of a, whose low-order bit is always 1).

In addition, embodiments make use of a 64-bit fixed integer constant m, which is identical for all instances of the method. According to an embodiment, the PRNG makes use of two subgenerators: a linear congruential generator and an xorshift generator. The linear congruential generator uses multiplier m and has additive parameter a and state s. In one embodiment, m=3935559000370003845. The xorshift generator has state x0 and x1. In one embodiment, the algorithm for the xorshift generator is xoroshiro128:

---

Illustration 1: Pseudocode reflecting an embodiment

⟨1⟩ z := s + x0
⟨2⟩ s := 3935559000370003845 * s + a
⟨3⟩ x1 := x1 XOR x0
⟨4⟩ x0 := x0 ROTATELEFT 24
⟨5⟩ x0 := x0 XOR x1 XOR (x1 SHIFTLEFT 16)
⟨6⟩ x1 := x1 ROTATELEFT 37
⟨7⟩ return z

---

The overall technique for performing a generate operation may be described by the pseudocode in Illustration 1. Line ⟨1⟩ adds the outputs of the two subgenerators (it is an optimization to use the generator outputs and then advance the generators; this improves potential instruction parallelism if one is using an optimizing compiler). Line ⟨2⟩ advances the state of the linear congruential generator. Lines ⟨3⟩ through ⟨6⟩ advances the state of the xorshift generator by performing the four steps of the xoroshiro128 algorithm; these four steps make use of bitwise exclusive-or (XOR), left shift (SHIFTLEFT), and rotate (ROTATELEFT) operations.

---

Illustration 2: Java code reflecting an embodiment

```
public class L64X128Random {
    final long a; // must be odd
    long s, x0, x1;
    public L64X128Random(long a, long s, long x0, long x1) {
        this.a = a | 1;
        this.s = s;
        this.x0 = ((x0 | x1) == 0) ? 1 : x0;
        this.x1 = x1;
    }
    public long generate( ) {
        long z = s + x0;
        s = 3935559000370003845L * s + a;
        x1 ^= x0;
        x0 = Long.rotateLeft(x0, 24);
        x0 = x0 ^ x1 ^ (x1 << 16);
        x1 = Long.rotateLeft(x1, 37);
        return z;
    }
    public L64X128Random split( ) {
        return new L64X128Random(generate( ), generate( ),
            generate( ), generate( ));
    }
    public L64X128Random split(long brine) {
        return new L64X128Random(brine << 1, generate( ),
            generate( ), generate( ));
    }
}
```

---

In order to do a split operation with no argument, of the sort supported in the SPLITMIX algorithm, the embodiment (as shown in Illustration 2) simply performs four generate operations to obtain four 64-bit integers; forces the first integer to be odd by using a bitwise OR operation with the integer constant 1; replaces the third integer with a nonzero value if the third and fourth integers are both zero; and then uses all four 64-bit integers as initial values a, s, x0, x1, respectively, for a newly created PRNG instance.

On the other hand, in order to do a split operation with an argument that supplies brine (such an operation is a novel aspect of embodiments described herein), the embodiment (as shown in Illustration 2) creates one 64-bit integer by shifting the brine left one position and then using a bitwise OR operation with the integer constant 1 (so that the result will be an odd integer), then uses three generate operations to obtain four 64-bit integers in all; replaces the third integer of the four with a nonzero value if the third and fourth integers are both zero; and then uses all four 64-bit integers as initial values a, s, x0, x1, respectively, for a newly created PRNG instance. Note that the value computed from the brine is used to initialize the additive parameter a.

As indicated above, an example implementation of this embodiment may be described in the Java programming language as shown in Illustration 2. The public constructor takes four long (64-bit) integer arguments, and does the work of forcing the first to be odd and of replacing the third with a nonzero value (in this example, the nonzero value is 1) if the third and fourth values are both zero. The generate ( ) method performs the same computation as the pseudocode in Illustration 1. If it is desired to use a mixing function (such as murmurhash3), then the statement "return z;" is replaced by "return murmurhash3 (z);". The split ( ) method calls the generate ( ) method four times and uses the four results as arguments to the constructor to create a new PRNG object. The split (long) method shifts the brine argument left one bit position, calls the generate ( ) method three times, and uses the four results as arguments to the constructor to create a new PRNG object.

Creating a Collection of Brined PRNGS with a Known Cardinality

In the case of creating a collection of PRNG objects based on brine values, where the cardinality of the collection to be created is known ahead of time, the cardinality of the collection is referred to as n. In one embodiment, a pseudorandomly chosen 64-bit salt value is first computed; it is chosen so that the k lowest bits of the value are 0-bits, where k is the smallest integer such that $2^k$ is not smaller than n, but the 64-k high-order bits of the salt value are chosen pseudorandomly. Then a for loop is used to generate index values from 0 through n−1. On each iteration, the split method is called with a brine argument computed as the bitwise OR of the salt value and the index value for that iteration. The following Illustration 3 shows an additional Java method makePrngVector for class L64X128 Random that creates such a collection of n PRNG objects and returns them as a collected "vector" of PRNG objects.

Illustration 3:
Java code for constructing a vector of PRNG objects using brine

```
Vector<L64X128Random> makePrngVector(int n) {
    Vector<L64X128Random> result = new Vector<L64X128Random>(n);
    long salt = generate( ) & ~(((1L << 63) >>>
        (Long.numberOfLeadingZeros(n−1) − 1)) − 1);
    for (int index = 0; index < n; index++) {
        result.add(split(salt | index));
    }
    return result;
}
```

If the integer n−1 can be represented as an (unsigned) binary value using at most m bits, then the low m bits of the computed salt value will be zero. Therefore, the n brine values computed for then calls to the split method will be distinct, because each will have a distinct index value in its low m bits. Therefore, no two of the n PRNG objects in the collection will have the same additive parameter. The fact that the 64-m high-order bits of the brine contain a value chosen once, pseudorandomly, for use by all PRNG objects in the collection still makes it relatively unlikely that two PRNG objects will have the same additive parameter even if they were created as part of two different collections, or if one was created as part of a collection and the other was created by a call to split ( ).

Creating a Collection of Brined PRNGS with an Unknown Cardinality-Sliding Boundary Pointer At times it is required to create a collection of PRNG objects where the cardinality of the collection to be created is not known ahead of time. In one embodiment, a method makePrngGenerator is provided by class L64X128Random to obtain a PRNG-generator object that represents a collection, and every time its generatePrng method is called, a new L64X128Random object is created for that collection and returned. When the PRNG-generator object (represented by an inner class PrngGenerator) is created by method makePrngGenerator, a pseudorandomly chosen 64-bit salt value is first computed and saved as part of that PRNG-generator object, and the salt is used to create brine each time the generatePrng method is called.

The idea is to have a sliding boundary, within brine values created for a given collection, between the salt value being used for the collection and the index of a given PRNG in the collection. Such a sliding boundary ensures that the brine values for the different PRNGs in a given collection are distinct, and that there are no accidental collisions between brine values of the different PRNGs in the collection. Furthermore, the pseudorandom salt values used in the brine values of each collection increases the likelihood that PRNGs from different collections will produce pseudorandom numbers that are statistically-independent from each other.

According to an embodiment, a set of six boundary pointer bits in the representation of a given brine value represents a sliding boundary pointer that is initialized to 0-bits. The sliding boundary pointer value keeps track of a bit within the brine value representation that comprises a boundary between salt value bits and index value bits within the brine value representation. According to an embodiment, this set of six bits are the high-order bits in the representation of the brine value. The value represented by the set of boundary pointer bits, b, is a bit index that refers to a bit in the representation of the brine value. Thus, according to an embodiment, within a representation of a given brine value, a value of b in the 6-bit boundary pointer field indicates that the b low-order bits of the brine value are index bits and the 58-b bits to their left are salt bits that have been chosen pseudorandomly. The description, in this embodiment, of the locations of the boundary pointer bits, salt bits, and index bits are non-limiting examples.

According to an embodiment, to create a PrngGenerator configured to generate PRNGs one-by-one, a salt value is initially computed by generating a 64-bit pseudorandom value. Creation of a brine value is initiated by shifting the salt value to the right 6 positions, bringing six 0-bits in at the left to indicate that the boundary between salt and index is at the right-hand end of the brine value representation. Notice that, if it is assumed that $2^{58}$ is a pragmatic upper limit on the number of times the generatePrng method is called, the brine values for any two such invocations will be distinct. The following Illustration 4 shows example Java code for this approach.

Illustration 4: Java code for creating a generator of PRNG objects using brine

```
PrngGenerator makePrngGenerator( ) {
    return new PrngGenerator(generate( ) >>> 6);
}
class PrngGenerator {
    long index;
    long salt;
    PrngGenerator(long salt) { this.salt = salt; this.index = −1;}
```

-continued

Illustration 4: Java code for creating a generator of PRNG objects using brine

```
L64X128Random generatePrng( ) {
    index = index + 1;
    let b = (1 << (salt >>> 58));
    if (index >= b) {
        salt &= ~b;
        salt += (1 << 58);
    }
    return split(salt | index);
}
```

An example of the functioning of Illustration 4 is presented with a simplified brine value having 7 bits with 3 bits reserved for a boundary pointer. The portion of the salt value represented in the brine value is 101, the current index is 1, and the current boundary pointer points to bit #1 in the brine value representation, i.e., brine=0011011. At the next generation of a new PRNG for the collection, the PrngGenerator object increases the index to 2, and now two index bits are required to represent the index value, i.e., index=10. Thus, the boundary pointer value becomes 010. In order to fit the larger index representation, one of the salt bits is cancelled out such that salt=10. As such, the brine value for the next PRNG is 0101010.

At the subsequent generation of a new PRNG for the collection, the index grows to 3, and two index bits are still required to represent the index value, i.e., index=11. Thus, the boundary pointer value remains 010, and the brine value for this new PRNG is 0101011. While the last four bits of the brine value happen to be the same as the brine value for a previous PRNG, the boundary pointer value is necessarily different. Thus, for 64-bit brine values, this technique guarantees that all brine values in the collection are unique given the upper limit to the number of PRNGs in the collection, which is $2^{58}$.

Creating a Collection of Brined PRNGS with an Unknown Cardinality—Bit Groups with Flags In another embodiment, a method makePrngGenerator and an inner class PrngGenerator of the class L64X128Random are used in much the same way, but a different representation is used for the salt in order to advantageously use a faster test for whether the salt value needs to be adjusted, as well as a faster way to adjust the salt.

The idea is again to have a sliding boundary, in the brine value, between the salt and the index, but to keep track of it using a unary representation rather than a binary representation. Specifically, in each 8-bit byte of the 64-bit word, let the high-order bit be regarded as a flag bit. The boundary between the salt and the index is just to the right of the flag bit in the leftmost byte whose flag bit is 1.

The salt is initially computed by generating a 64-bit pseudorandom value, setting the flag bit of each 8-bit byte to 0 and the lowest byte to 0, then setting the flag bit of the lowest byte to 1. Whenever the index becomes large enough to "bump into" the lowest 1-bit of the salt, the salt is shifted left 8 positions.

Notice that, if it is assumed that $2^{55}$ is a pragmatic upper limit on the number of times the generatePrng method is called, the brine values for any two such invocations will be distinct. Further note that, because the leftmost bit of the brine is discarded by the shifting operation in the method split (long) (in Illustration 2), the pragmatic upper limit on the number of times that the generatePrng method is called is $2^{55}$ rather than $2^{63}$. The following Illustration 5 shows example Java code for this approach.

Illustration 5: Java code for creating a generator of PRNG objects using brine

```
makePrngGenerator( ) {
    long salt = (generate( ) & 0x7F7F7F7F7F7F7F00L) | 0x80L;
    return new PrngGenerator(salt);
}
class PrngGenerator {
    long index;
    long salt;
    PrngGenerator(long salt) { this.salt = salt; this.index = −1;}
    generatePrng( ) {
        index = index + 1;
        if ((salt & index) != 0) {
            salt = salt << 8;
        }
        return split(salt | index);
    }
}
```

For example, the brine value of a particular PRNG from a given collection is 00100111 00011101 01111011 01101010 01010001 01011110 00011010 11111111. The high-order bit of each byte that represents salt value in the representation of the brine value is a flag bit that indicates that the byte includes salt data (i.e., 0). Furthermore, a boundary bit between bits representing salt value and bits representing an index value is an additional flag bit, with a different value from the flag bits indicating salt value, that indicates the beginning of index value bits. In this example, the index value is located in the 7 low-order bits of the brine value representation. However, according to one or more embodiments, the index value may be located elsewhere in the brine value representation, such as in the high-order bits.

In the example brine value given above, the index value is the maximum value representable by the available 7 index bits. Thus, when a next PRNG is requested for the collection, the index (10000000) for the PRNG exceeds the capacity of the current index bits, and the salt is moved to the left by 8 bits in order to make room for the larger index value as follows: 00011101 01111011 01101010 01010001 01011110 00011010 10000000 10000000. In this case, the index now has 15 bits of room, even though the index value is representable by 8 of the bits. Note that, after the first flag bit indicates the beginning of index data with a value of 1, the remainder of the low-order bits are index data. Thus, the 1 at the beginning of the last byte is not interpreted as a flag, but as index data. Also, because the boundary flag position moves every time the index bits are expanded, it is guaranteed that every value generated with the new boundary flag position is unique because there was necessarily a salt flag value in that position prior to the expansion.

Creating a Collection of Brined PRNGS with an Unknown Cardinality—Boundary Indicator Bit Group In another embodiment, a method makePrngGenerator and an inner class PrngGenerator of the class L64X128Random are used in much the same way, but yet another representation is used for the salt in order to advantageously get more "randomness" into each brine value.

The idea is again to have a sliding boundary, in the brine value, between the salt and the index, and again the idea is to keep track of the boundary by dividing the 64-bit word into groups of bits and identifying the leftmost group that has some particular characteristic. Let k be a fixed integer between 2 and 63, and let the word be divided into groups of k bits, starting from the left-hand end (there may be a leftover group of bits smaller than k at the right-hand end).

The boundary between the salt and the index is just to the right of the leftmost group that is all 1-bits.

The salt is initially computed by generating a 64-bit pseudorandom value, then using the value to compute a series of "digits" base $2^k$-1; each such digit can be represented in k bits, but no such digit satisfies a boundary value test, e.g., representing the maximum value that may be represented by the digit. The rightmost group of k bits is set to all 1-bits, and any partial group to its right is set to all 0-bits. Whenever the index becomes large enough to "bump into" the lowest 1-bit of the salt, the salt is shifted left k positions.

Notice that, if it is assumed that $2^{64-k}$ is a pragmatic upper limit on the number of times the generatePrng method is called, the brine values for any two such invocations will be distinct. The following Illustration 6 shows Java code for an embodiment of this approach in which k=4. When k is 4, 5, or 6, the wastage of salt values for purposes of sliding boundary representation is generally minimized.

Note that Illustration 6 performs arithmetic to uniformly select from the possible values (minus the value that satisfies the boundary value test) for each digit in the salt portion of the brine value. Further, this technique is capable of retaining the highest range of possible salt values of the variable-cardinality brine representation techniques described herein. However, the arithmetic required for this technique may cause this technique to be prohibitive when brine-based PRNG generators are implemented in hardware. For a hardware encoding, one of the previous variable-cardinality brine representation techniques may be more efficient in that the arithmetic required is more simple than what is required for this technique. An example of representing a brine value as depicted in Illustration 6 is given in connection with the description of FIG. 1 below.

---

Illustration 6: Java code for creating a generator of PRNG objects using brine

```
static final int k = 4;
makePrngGenerator( ) {
   long bits = generate( );
   long multiplier = (1 << k) - 1;
   long salt = multiplier << (64 - k);
   while ((salt & multiplier) != 0) {
      long digit = Long.multiplyHigh(bits, multiplier)
          << (64 - k);
      salt = (salt >>> k) | digit;
      bits *= multiplier;
   }
   return new PrngGenerator(salt);
}
class PrngGenerator {
   long index;
   long salt;
   PrngGenerator(long salt) { this.salt = salt; this.index = -1;}
   generatePrng( ) {
      index = index + 1;
      if ((salt & index) != 0) {
         salt = salt << k;
      }
      return split(salt | index);
   }
}
```

---

Delivering a Collection of Brined PRNGS in a Stream

In one embodiment, it is desirable to deliver a collection of PRNG objects in the form of a Java stream that may admit, among other operations, serial or parallel computation of multiple invocations of a function to each PRNG object in the stream. Embodiments create such a stream by defining a "spliterator" class and then using an appropriate instance of that class to construct a stream.

The following Illustration 7 shows example Java code for two (overloaded) definitions of a method splits for the class L64X128Random. The first one takes no arguments and constructs a stream of indefinite length (in practice, one of length up to $2^{63}$-1); it computes salt according to the same method used in Illustration 6 (where the parameter k from Illustration 6 is called SALT_SHIFT in Illustrations 7 and 8). The second one takes an argument n indicating the number of PRNG objects to be created; it computes salt according to the same method used in Illustration 3. In this manner, the salt is computed in one of two different ways depending on whether or not the number of PRNG objects to be created is known in advance.

---

Illustration 7: Java code reflecting an embodiment

```
static final int SALT_SHIFT = 4;
public Stream<L64X128Random> splits( ) {
   long bits = generate( );
   long multiplier = (1 << SALT_SHIFT) - 1;
   long salt = multiplier << (64 - SALT_SHIFT);
   while ((salt & multiplier) != 0) {
      long digit = Long.multiplyHigh(bits, multiplier)
          << (64 - SALT_SHIFT);
      salt = (salt >>> SALT_SHIFT) | digit;
      bits *= multiplier;
   }
   return StreamSupport.stream(new SaltSpliterator(this, 0L,
       Long.MAX_VALUE, salt), false);
}
public Stream<L64X128Random> splits(long n) {
   long mask = ~(((1L << 63) >>>
       (Long.numberOfLeadingZeros(n-1) - 1)) - 1);
   long salt = generate( ) & mask;
   return StreamSupport.stream(new SaltSpliterator(this, 0L, n,
       salt), false);
}
```

---

The following Illustration 8 shows example Java code for the definition of the class SaltSpliterator. Its constructor accepts four arguments: the pseudorandom number generator that created it (needed for calls to its split ( ) and split (long) methods), the inclusive lower bound and the exclusive upper bound on the range of integer indices for which to generate PRNG objects, and a salt value. The method trySplit ( ) attempts to divide the remaining range in (approximately) half and create a new spliterator object that will handle one of the halves (the low half) while this spliterator keeps the other half (the high half); it returns null if this is not possible. (This ability to divide a spliterator into two independent spliterators that utilize the same salt value is what enables parallel execution.)

The current SaltSpliterator object takes on the LOW half of the interval (from index to m) and the new SaltSpliterator object takes on the HIGH half of the interval (from m to fence). The reason is that the constructor for the new object will make sure to shift the salt if necessary; if the current object takes on the high half, then the trySplit method must also check to see whether the salt must be shifted, but if it takes on the low half, then there is no need for trySplit to shift the salt.

In the case of a new SaltSpliterator object taking on the HIGH half of the interval of the original SaltSpliterator object (i.e., from m to fence), the constructor of the SaltSpliterator object adjusts the salt value, as needed, in order to accommodate index values starting from the new index (previously m), which may be significantly larger than the index from the original SaltSpliterator object. Specifically, given the representation of the sliding boundary being used in Illustrations 7 and 8, the constructor of the SaltSpliterator object shifts the salt value by k bits (represented in the constructor as SALT_SHIFT) as many times as is needed to accommodate a representation of the current index. In the case of a known cardinality for the collection, the salt value is configured such that the index will always fit in the space allocated for index bits in the brine value representation. As such, reconfiguration of the salt value is never required upon splitting off a new SaltSpliterator object for a collection with a known cardinality.

The method tryAdvance attempts to create just one new PRNG object for the index that is the current value of the index field; if it succeeds, it passes this new PRNG object to a given consumer function, reduces the size of the range by 1 to indicate that that index value has been processed, and then returns true, but if it fails (because the remaining range is empty) it returns false. The method forEachRemaining processes the entire remaining (possibly empty) range, creating a new PRNG object for each index in the remaining range and passing it to a given consumer function; it also updates the index field to indicate that the remaining range is empty. Novel portions in the example Java code of Illustration 8 include the use of rng.split ( ) in the method trySplit ( ) and the use of (rng.split (salt|i) to compute and pass brine in the methods tryAdvance and forEachRemaining.

---

Illustration 8: Java code reflecting an embodiment (cont. of Illustration 7)

```
protected static class SaltSpliterator implements
       Spliterator<L64X128Random>{
    long index;
    final long fence;
    final L64X128Random rng;
    long salt;
    SaltSpliterator(L64X128Random rng, long index, long fence,
           long salt) {
       this.index = index;
       this.fence = fence;
       this.rng = rng;
       while ((salt != 0) &&
              (Long.compareUnsigned(salt & -salt, index) <= 0)) {
           salt = salt << SALT_SHIFT;
       }
       this.salt = salt;
    }
    public long estimateSize( ) { return fence - index; }
    public int characteristics( ) {
       return (Spliterator.SIZED | Spliterator.SUBSIZED |
              Spliterator.NONNULL | Spliterator.IMMUTABLE);
    }
    public Spliterator<L64X128Random> trySplit( ) {
       long m = (index + fence) >>> 1;
       if (m <= index) return null;
       long f = fence;
       fence = m;
       return new SaltSpliterator(rng.split( ), m, f, salt);
    }
    public boolean tryAdvance(Consumer<? super L64X128Random>
           consumer) {
       if (consumer == null) throw new NullPointerException( );
       long i = this.index, f = this.fence;
       if (i < f) {
           consumer.accept(rng.split(salt | i));
           ++i;
           this.index = i;
           if ((i & salt) != 0) salt <<= SALT_SHIFT;
           return true;
       }
       return false;
    }
    public void forEachRemaining(Consumer<? super L64X128Random>
           consumer) {
       if (consumer == null) throw new NullPointerException( );
       long i = this.index, f = this.fence;
```

---

Illustration 8: Java code reflecting an embodiment (cont. of Illustration 7)

```
       if (i < f) {
           this.index = f;
           do {
              consumer.accept(rng.split (salt | i) ) ;
              ++i;
              if ((i & salt) != 0) salt <<= SALT_SHIFT;
           } while (i < f);
       }
    }
}
```

---

Example Stream Implementation Creating a Collection with a Known Cardinality FIG. 1 depicts a flowchart 100 for creating PRNGs of a collection of PRNGs using brine values. Specifically, at step 102, a request to create a collection of PRNGs is received. For example, a processor causes a splits method (see Illustration 7) to be run on an object of type Stream<L64X128Random>, with a parameter of 3 that indicates that the SaltSpliterator object in the stream is to be configured to create a PRNG collection having a cardinality of 3. The processor further causes either the tryAdvance method or the forEachRemaining method to be called on the stream, which causes the stream to, respectively: add one PRNG for the collection to the stream; or create all remaining PRNGs for the collection in the stream. Note that this is a non-limiting example, and such a request to create a collection may comprise a request to a PrngGenerator object to create a single PRNG in a collection using the generatePrng method. Note that a collection of PRNGs may include only one PRNG.

According to an embodiment, steps 104 and 106 of flowchart 100 are performed as part of creating a collection of PRNGs in response to receiving the request to create a collection of PRNGs.

At step 104, a salt value comprising a pseudorandom number is generated. For example, the splits method in Illustration 7 pseudorandomly generates a 64-bit salt value and passes at least a portion of this salt value to the SaltSpliterator constructor. To illustrate, the pseudorandom 64-bit salt value is 0010 0111 1001 1101 1111 1011 0110 1010 1101 0001 0101 1110 1001 1010 1100 1011.

At step 106, each PRNG of the collection of PRNGs is created based on a respective brine value that comprises both (a) at least a portion of the salt value and (b) a respective index value that is unique to the respective PRNG within the collection of PRNGs. For example, the splits method masks off a number of lowest bits such that the number of masked-off bits is of sufficient size to represent a value as big as the cardinality of the requested collection. Continuing from the example above, 2 bits are sufficient to represent a number as big as 3 and, as such, the splits method prepares the salt value that will be passed into the SaltSpliterator constructor to accept index information by setting the lowest-order two bits of the salt value to 0 as follows: 0010 0111 1001 1101 1111 1011 0110 1010 1101 0001 0101 1110 1001 1010 1100 1000.

To further illustrate, the processor uses the initialized SaltSpliterator object described above to create the three required PRNGs for the requested collection, where each PRNG is associated with a respective index value that is unique to the PRNG among the PRNGs of the collection.

The following indicates the brine values for the generated PRNGs given the example parameters above:
- PRNG [0]: index value=00; brine value=0010 0111 1001 1101 1111 1011 0110 1010 1101 0001 0101 1110 1001 1010 1100 1000;
- PRNG [1]: index value=01; brine value=0010 0111 1001 1101 1111 1011 0110 1010 1101 0001 0101 1110 1001 1010 1100 1001; and
- PRNG [2]: index value=10; brine value=0010 0111 1001 1101 1111 1011 0110 1010 1101 0001 0101 1110 1001 1010 1100 1010.

The brine values are passed into the split method of a PRNG, as shown in Illustration 8, which causes creation of the new PRNG based on the brine value of the PRNG. Accordingly, each PRNG is instantiated using a brine value that is guaranteed to be unique among the PRNGs of the collection.

Pseudorandom numbers being generated by any of the PRNGs in the collection are generated based, at least in part, on the brine value for the PRNG. Specifically, when the generate method is called on the instantiated PRNG[0] object, PRNG[0] utilizes the brine value with which it was instantiated to generate the requested pseudorandom number, e.g., as the additive parameter (a) utilized in the generate method of Illustration 2.

Specifically, the a value is based on the brine value that was passed into the split method that accepts the brine parameter. The brine value is shifted to the left by one before it is assigned to be the additive parameter in the new PRNG object, which is then forced to be odd. Thus, the additive parameter of PRNG[0] is based on the brine value with which the object is instantiated because the a value is the brine value shifted to the left and forced to be odd as follows: 0100 1111 0011 1011 1111 0110 1101 0101 1010 0010 1011 1101 0011 0101 1001 0001. Accordingly, the generate method utilizes this adapted brine value to generate a new pseudorandom number, as indicated above.

Example Stream Implementation Creating a Collection with an Unknown Cardinality

To illustrate creating PRNGs of a collection using brine values in the context of a request for a collection of unknown cardinality, a processor causes the splits method (see Illustration 7) to be run on an object of type Stream<L64X128Random> without any parameter to the method. The version of the splits method that does not accept a parameter initializes the fence value to the maximum value that is representable by a long integer. The processor further causes the tryAdvance method to be called on the stream, which causes the stream to add one PRNG to the collection by calling the accept method of the stream's consumer. In Illustration 8 above, the SaltSpliterator implements a sliding boundary indicator in the brine values of the collection with a bit group of size k=4, as depicted in Illustration 6.

Specifically, the salt value for the collection is initially computed by generating a 64-bit pseudorandom base value called bits in Illustration 7. The salt value is initialized with a boundary digit having the maximum representable value as the left-most digit (or highest-order four bits) in the representation of the salt value, according to the example boundary value test described above. The bits value is used to generate random digits (each represented by k bits) for the salt value. Because of the example boundary value test, each randomly-generated digit has a value of less than the maximum representable value. The randomly-generated digits are shifted into the salt value representation to the left of the boundary digit until the boundary digit is located in the lowest-order position in the representation. Note that, if there are any remainder digits, i.e., for a k value that does not evenly divide into 64 bits, those bits are maintained to the right of the boundary digit and may be used to represent index information. To illustrate, an example salt value generated by the splits ( )method is: 0xA04C427B456ED91F (where the only digit having the maximum value is the lowest-order digit).

Whenever the index value for a collection becomes large enough to "bump into" the lowest 1-bit of the salt value, the salt value is shifted to the left by k positions. For example, the SaltSpliterator object initiated during the splits method is based on the example generated salt value given above (e.g., 0xA04C427B456ED91F). Because there is no room for an index value in the generated salt value, the salt value is automatically shifted to the left by k bits, resulting in a salt value of 0x04C427B456ED91F0. The resulting SaltSpliterator object bases each new PRNG on at least a portion of this salt value. Specifically, the tryAdvance method causes a PRNG to split based on a brine value that comprises the current salt value for the collection ORed with the current index, which results in basing the new PRNG on this unique brine value. Furthermore, the tryAdvance method shifts the salt value over by k bits if the next index does not fit into the bits that are to the right of the boundary index digit.

Alternatives and Extensions

Embodiments may do any of, more than one of, or all of the following, without departing from the spirit and scope of this invention:
- Use a subgenerator other than a linear congruential generator that is one of a family of generators characterized by a parameter that selects or characterizes members of the family.
- Use more than two subgenerators, as long as at least one is a subgenerator characterized by a parameter initialized with brine.
- Use more than two subgenerators, as long as at least one is a linear congruential generator with an additive parameter initialized with brine.
- Use arithmetic on integers of sizes other than 64 bits to implement a linear congruential generator (LCG).
  - In one embodiment, the LCG uses a 16-bit multiplier, a 16-bit additive parameter, and a 16-bit state.
  - In one embodiment, the LCG uses a 16-bit multiplier, a 16-bit additive parameter, and a 32-bit state.
  - In one embodiment, the LCG uses a 16-bit multiplier, a 32-bit additive parameter, and a 32-bit state.
  - In one embodiment, the LCG uses a 32-bit multiplier, a 16-bit additive parameter, and a 32-bit state.
  - In one embodiment, the LCG uses a 32-bit multiplier, a 32-bit additive parameter, and a 32-bit state.
  - In one embodiment, the LCG uses a 32-bit multiplier, a 32-bit additive parameter, and a 64-bit state.
  - In one embodiment, the LCG uses a 32-bit multiplier, a 64-bit additive parameter, and a 64-bit state.
  - In one embodiment, the LCG uses a 64-bit multiplier, a 32-bit additive parameter, and a 64-bit state.
  - In one embodiment, the LCG uses a 64-bit multiplier, a 64-bit additive parameter, and a 128-bit state.
  - In one embodiment, the LCG uses a 64-bit multiplier, a 128-bit additive parameter, and a 128-bit state.
  - In one embodiment, the LCG uses a 128-bit multiplier, a 64-bit additive parameter, and a 128-bit state.
  - In one embodiment, the LCG uses a 128-bit multiplier, a 128-bit additive parameter, and a 128-bit state.

Use arithmetic on integers of sizes other than 64 bits to implement an xorshift generator.
  In one embodiment, the xorshift generator uses two 32-bit state words.
  In one embodiment, the xorshift generator uses four 32-bit state words.
  In one embodiment, the xorshift generator uses four 64-bit state words.
  In one embodiment, the xorshift generator uses eight 64-bit state words.
  In one embodiment, the xorshift generator uses sixteen 64-bit state words.
Use various xorshift-style algorithms.
  In one embodiment, the xorshift generator algorithm is xoroshiro64.
  In one embodiment, the xorshift generator algorithm is xoroshiro128.
  In one embodiment, the xorshift generator algorithm is xoshiro256.
  In one embodiment, the xorshift generator algorithm is xoshiro512.
  In one embodiment, the xorshift generator algorithm is xoroshiro1024.
Use multipliers other than the specific multiplier value 3935559000370003845. For example, any of the multiplier values mentioned in Table 4 of the paper by L'Ecuyer [9] may be used.
An optional mixing step may be used after the outputs of the subgenerators are summed.
An alternate random or pseudorandom source may be used to choose the salt for a new collection of PRNGs.
Part or all of the salt may be computed based on characteristics of the processing environment that are known to be different, or likely to be different, from characteristics of other processing environments, such as:
  Thread ID
  Process ID
  Processor ID (such as a hardware serial number)
  Network interface ID (such as MAC address)
  IP address
  Time of day and/or date
The index may be represented in a brine value at some position other than the right-hand end.
The salt may be represented in a brine value at some position other than the left-hand end.
The boundary between salt and index may be determined by identifying a rightmost (rather than leftmost) bit field having some specific characteristic.
Aspects of embodiments include, without limitation:
In a pseudorandom number generator that uses subgenerators at least one of which is an LCG, the intentional choice of distinct additive parameters for the LCG component of two or more distinct generators, so as to guarantee that the state cycles of the two or more distinct generators are different.
When creating a collection of pseudorandom number generators, the use of distinct integer indexes to construct distinct additive parameters for distinct generators within the collection.
When creating a collection of pseudorandom number generators, the use of a "salt" value for the collection, chosen randomly or pseudorandomly, as part of the computation of each additive parameter.
When creating a collection of pseudorandom number generators, computing an additive parameter by combining a salt value and an index.
When creating a collection of pseudorandom number generators, computing an additive parameter by combining a salt value and an index in such a way that all the additive parameters computed for a collection will be distinct.
When creating a collection of pseudorandom number generators, computing an additive parameter by combining a salt value and an index in such a way that all the additive parameters computed for a collection will be distinct, even though no upper bound is known ahead of time for the number of PRNG objects to be created as part of the collection.
A method for combining a salt value and an index, in which the total number of PRNG objects to be created as part of the collection is known ahead of time, and is used to determine how many bits of salt to use.
A method for combining a salt value and an index, in which the total number of PRNG objects to be created as part of the collection is not known ahead of time, and in which the number of bits of index in a brine value can be determined by performing a computation on the brine value.
A method for combining a salt value and an index, in which the total number of PRNG objects to be created as part of the collection is not known ahead of time, and in which the number of bits of index in a brine value is encoded in a specific field of bits within the brine value.
A method for combining a salt value and an index, in which the total number of PRNG objects to be created as part of the collection is not known ahead of time, and in which the number of bits of index in a brine value can be determined by inspecting a plurality of bit fields within the brine value and identifying that the leftmost (or rightmost) of the plurality of fields has a flag bit equal to a specific value (such as 1).
A method for combining a salt value and an index, in which the total number of PRNG objects to be created as part of the collection is not known ahead of time, and in which the number of bits of index in a brine value can be determined by inspecting a plurality of bit fields within the brine value and identifying the leftmost (or rightmost) of the plurality of fields that has some other specific characteristic, such as being equal to a specific value (for example, all 1-bits).
A method for defining a stream of PRNG objects by using a spliterator that accepts a salt value and computes an appropriate brine value for each PRNG object created.

Whereas the SPLITMIX algorithm used in JDK8 has 127 bits of state (of which 64 are updated during each generate operation) and uses 9 64-bit arithmetic operations per 64 bits generated, embodiments use 255 bits of state (of which 192 are updated during each generate operation) and use 9 64-bit arithmetic operations per 64 bits generated. Another embodiment uses 383 bits of state (of which 320 are updated during each generate operation) and uses 10 64-bit arithmetic operations per 64 bits generated.

REFERENCES

[1] Austin Appleby. Murmurhash3, Apr. 3, 2011. Project wiki entry. http://code.google.com/p/smhasher/wiki/MurmurHash3 Accessed Sep. 10, 2013.
[2] Lennart Augustsson. Personal communication, Aug. 30, 2013. Concerning the Haskell source code for System. Random at https://hackage.haskell.org/package/random.
[3] Robert G. Brown, Dirk Eddelbuettel, and David Bauer. Dieharder: A random number test suite, version 3.31.1, 2003-2006. http://www.phy.duke.edu/~rgb/General/dieharder.php Accessed Sep. 10, 2013.
[4] Koen Claessen and Michal Palka. Splittable pseudorandom number generators using cryptographic hashing. In Proc. ACM SIGPLAN Haskell Symp., pages 47-58, 2013.
[5] Chris Doty-Humphrey. PractRand version 0.90, July 2014. Website at http://pracrand.sourceforge.net.
[6] Gregory W. Fischer, Ziv Carmon, Dan Ariely, Gal Zauberman, and Pierre L'Ecuyer. Good parameters and implementations for combined multiple recursive random number generators. *Operations Research*, 47(1):159-164, January 1999.
[7] Guy L. Steele Jr., Doug Lea, and Christine H. Flood. Fast splittable pseudorandom number generators. In *Proc. 2014 ACM International Conference on Object Oriented Programming Systems, Languages, and Applications*, OOPSLA '14, pages 453-472, New York, 2014. ACM.
[8] Pierre L'Ecuyer. Efficient and portable combined random number generators. *Comm. ACM*, 31(6):742-751, June 1988.
[9] Pierre L'Ecuyer. Tables of linear congruential generators of different sizes and good lattice structure. *Mathematics of Computation*, 68(225):249-260, January 1999.
[10] Pierre L'Ecuyer and Richard Simard. TestU01: A C library for empirical testing of random number generators. *ACM Trans. Math. Softw.*, 33(4), August 2007.
[11] Pierre L'Ecuyer, Richard Simard, E. Jack Chen, and W. David Kelton. An object-oriented random-number package with many long streams and substreams. *Operations Research*, 50(6):1073-1075, November 2002.
[12] Charles E. Leiserson, Tao B. Schardl, and Jim Sukha. Deterministic parallel random-number generation for dynamic-multithreading platforms. In *Proc. 17th ACM SIGPLAN Symp. Principles and Practice of Parallel Programming*, pages 193-204, New York, 2012. ACM.
[13] George Marsaglia and Wai Wan Tsang. Some difficult-to-pass tests of randomness. *Journal of Statistical Software*, 7(3):1-9, 1 2002.
[14] Makoto Matsumoto and Takuji Nishimura. Mersenne Twister: A 623-dimensionally equidistributed uniform pseudo-random number generator. *ACM Trans. Model. Comput. Simul.*, 8(1):3-30, January 1998.
[15] Andrew Rukhin, Juan Soto, James Nechvatal, Miles Smid, Elaine Barker, Stefan Leigh, Mark Levenson, Mark Vangel, David Banks, Alan Heckert, James Dray, and San Vo; revised by Lawrence E Bassham III. A statistical test suite for random and pseudorandom number generators for cryptographic applications. Technical Report Special Publication 800-22 Revision 1a, Information Technology Laboratory, National Institute of Standards and Technology, Gaithersburg, Md., April 2010. http://csrc.nist.gov/publications/nistpubs/800-22-rev1a/SP800-22rev1a.pdf.
[16] Richard Simard. TestU01 version 1.2.3, August 2009. Website at http://www.iro.umontreal.ca/~simardr/testu01/tu01.html.
[17] David Stafford. Better bit mixing: Improving on MurmurHash3's 64-bit finalizer, Sep. 28, 2011. Blog "Twiddling the Bits." http://zimbry.blogspot.com/2011/09/better-bit-mixing-improving-on.html Accessed Sep. 10, 2013.
[18] Sebastiano Vigna. An experimental exploration of Marsaglia's xorshift generators, scrambled. *ACM Trans. Math. Softw.*, 42(4):30:1-30:23, June 2016.
[19] Sebastiano Vigna. xoshiro/xoroshiro generators and the PRNG shootout, 2019.
[20] John Walker. HotBits: Genuine random numbers, generated by radioactive decay. Website at http://www.fourmilab.ch/hotbits/.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
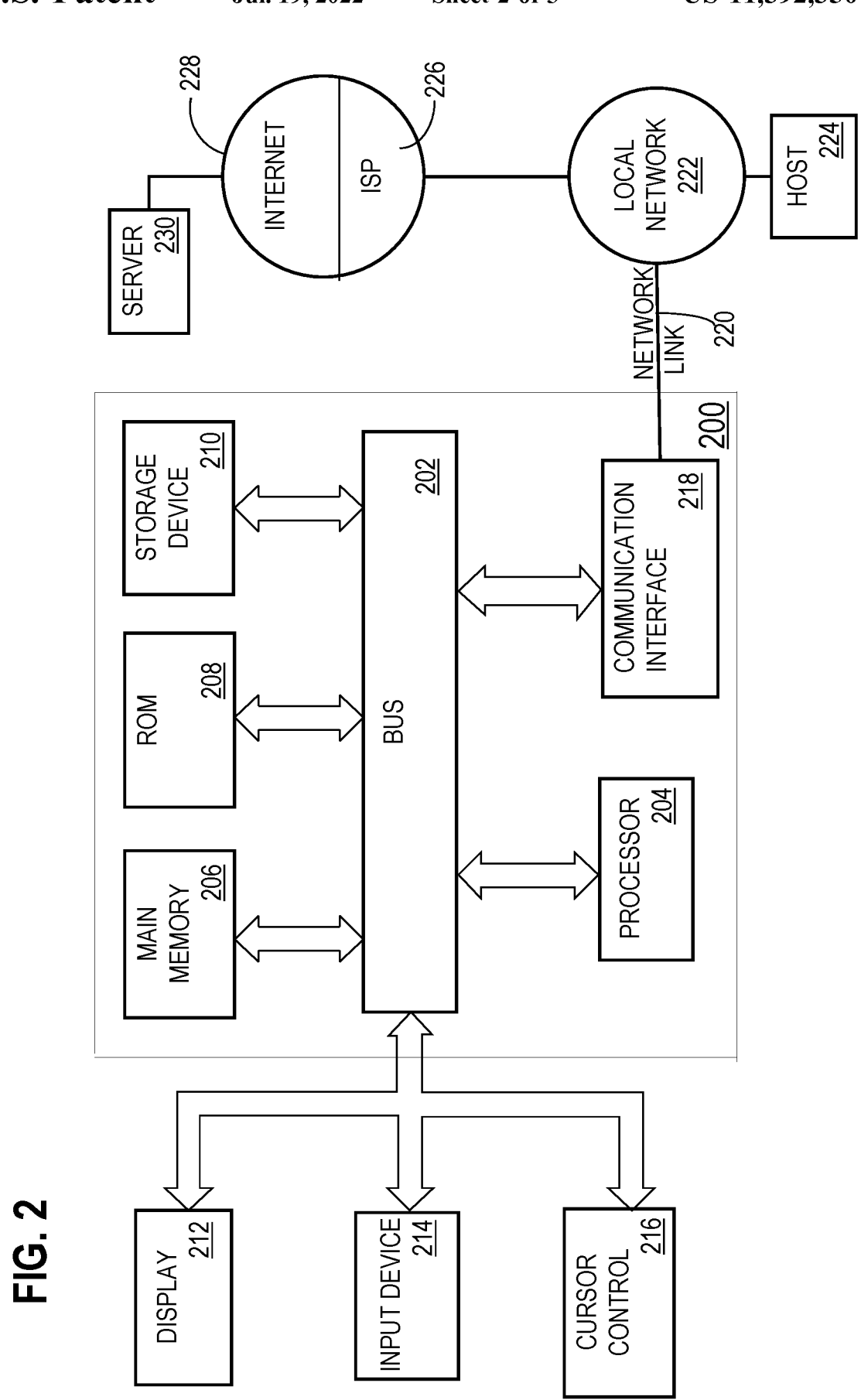
FIG. 2 is a block diagram of a computer system on which embodiments may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Software Overview

Figure 3:
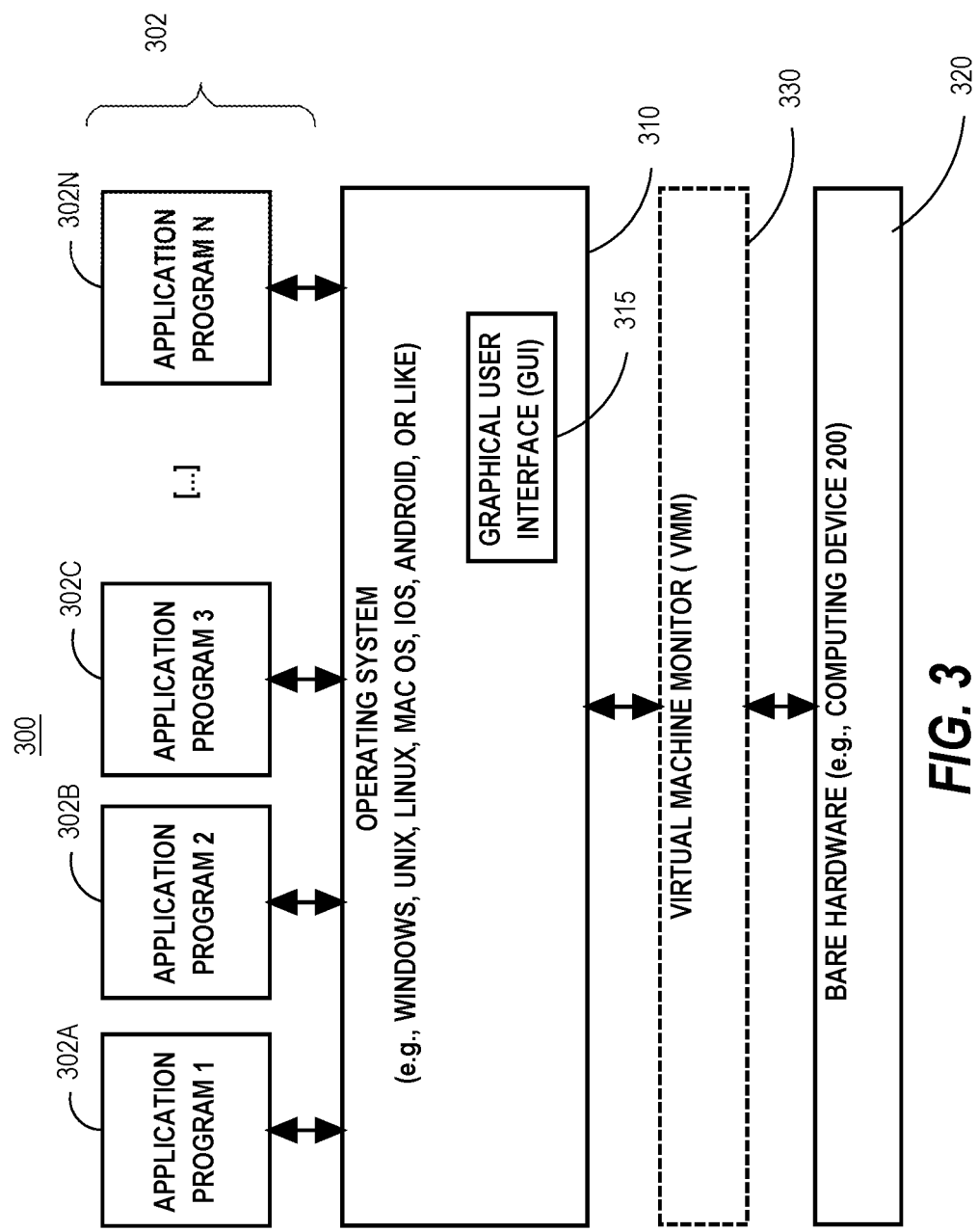
FIG. 3 depicts a software system that may be used in an embodiment.

FIG. 3 is a block diagram of a basic software system 300 that may be employed for controlling the operation of computer system 200. Software system 300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 300 is provided for directing the operation of computer system 200. Software system 300, which may be stored in system memory (RAM) 206 and on fixed storage (e.g., hard disk or flash memory) 210, includes a kernel or operating system (OS) 310.

The OS 310 manages low-level aspects of computer operation, including managing execution of processes, memory allocation, file input and output (I/O), and device I/O. One or more application programs, represented as 302A, 302B, 302C . . . 302N, may be "loaded" (e.g., transferred from fixed storage 210 into memory 206) for execution by the system 300. The applications or other software intended for use on computer system 200 may also be stored as a set of downloadable computer-executable instructions, for example, for downloading and installation from an Internet location (e.g., a Web server, an app store, or other online service).

Software system 300 includes a graphical user interface (GUI) 315, for receiving user commands and data in a graphical (e.g., "point-and-click" or "touch gesture") fashion. These inputs, in turn, may be acted upon by the system 300 in accordance with instructions from operating system 310 and/or application(s) 302. The GUI 315 also serves to display the results of operation from the OS 310 and application(s) 302, whereupon the user may supply additional inputs or terminate the session (e.g., log off).

OS 310 can execute directly on the bare hardware 320 (e.g., processor(s) 204) of computer system 200. Alternatively, a hypervisor or virtual machine monitor (VMM) 330 may be interposed between the bare hardware 320 and the OS 310. In this configuration, VMM 330 acts as a software "cushion" or virtualization layer between the OS 310 and the bare hardware 320 of the computer system 200.

VMM 330 instantiates and runs one or more virtual machine instances ("guest machines"). Each guest machine comprises a "guest" operating system, such as OS 310, and one or more applications, such as application(s) 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of computer system 200 directly. In these instances, the same version of the guest operating system configured to execute on the bare hardware 320 directly may also execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   generating a salt value comprising a first pseudorandom number;
   creating each pseudorandom number generator (PRNG of a collection of PRNGs based on a PRNG-specific brine value that comprises both (a) at least a portion of the salt value and (b) an index value that is unique to said each PRNG within the collection of PRNGs; and
   causing two or more PRNGs, of the collection of PRNGs, to produce pseudorandom numbers in parallel by running the two or more PRNGs on respective two or more threads of a multi-threaded processor;
   wherein the method is performed by one or more computing devices.

2. The method of claim 1, further comprising:
   receiving a request for a particular PRNG, of the collection of PRNGs, to generate a pseudorandom number;
   wherein the particular PRNG was created based on a particular brine value;
   in response to receiving the request for the particular PRNG to generate a pseudorandom number, the particular PRNG utilizing at least a portion of the particular brine value to generate a pseudorandom number; and
   the particular PRNG returning the generated pseudorandom number as a response to the request to generate a pseudorandom number.

3. The method of claim 1, wherein creating each PRNG of the collection of PRNGs based on a PRNG-specific brine value comprises creating a particular PRNG based on a particular brine value by causing an additive parameter for the particular PRNG to comprise at least part of the particular brine value.

4. The method of claim 1, wherein:
   creating each PRNG of the collection of PRNGs based on a PRNG-specific brine value comprises creating a particular PRNG based on a particular brine value that comprises a particular portion of the salt value and a particular index value that is unique to the particular PRNG;

the method further comprises generating the particular brine value by:
  determining a number of bits, wherein a set of bits that comprises the determined number of bits is capable of representing at least a known cardinality of the collection of PRNGs,
  populating a first set of bits in a representation of the particular brine value with the particular portion of the salt value, and
  populating a second set of bits in the representation of the particular brine value with the particular index value, wherein the number of bits in the second set of bits is the determined number of bits.

5. The method of claim 1, wherein:
creating each PRNG of the collection of PRNGs based on a PRNG-specific brine value comprises creating a particular PRNG based on a particular brine value that comprises a particular portion of the salt value and a particular index value that is unique to the particular PRNG;
the method further comprises generating the particular brine value by:
  populating a first set of bits, in a representation of the particular brine value, with a sliding boundary index value, wherein the number of the first set of bits is pre-determined,
  wherein the sliding boundary index value identifies a particular bit in the representation of the particular brine value,
  populating a second set of bits, a boundary of which is the particular bit in the representation of the particular brine value, with the particular index value, and
  populating a third set of bits, comprising bits of the representation of the particular brine value that are not in the first set of bits and also not in the second set of bits, with the particular portion of the salt value.

6. The method of claim 1, wherein:
creating each PRNG of the collection of PRNGs based on a PRNG-specific brine value comprises creating a particular PRNG based on a particular brine value that comprises a particular portion of the salt value and a particular index value that is unique to the particular PRNG;
the method further comprises generating the particular brine value by:
  setting a flag bit of each bit group, of one or more first bit groups in a representation of the particular brine value, to indicate that said each bit group includes salt value information,
  wherein the one or more first bit groups collectively represent the particular portion of the salt value, and
  setting an index flag bit, of one or more second bit groups in the representation of the particular brine value, to indicate a boundary bit for the particular index value,
  wherein the one or more second bit groups collectively represent the particular index value.

7. The method of claim 1, wherein:
creating each PRNG of the collection of PRNGs based on a PRNG-specific brine value comprises creating a particular PRNG based on a particular brine value that comprises a particular portion of the salt value and a particular index value that is unique to the particular PRNG;
the method further comprises generating the particular brine value by:
  populating a first set of one or more bit groups, in a representation of the particular brine value, with the particular portion of the salt value,
  wherein each bit group, of the first set of one or more bit groups, represents a value that does not satisfy a boundary value test,
  populating a boundary bit group, in the representation of the particular brine value, with a value that satisfies the boundary value test, and
  populating a second set of one or more bit groups, in the representation of the particular brine value, with the particular index value,
  wherein the boundary bit group is located, in the representation of the particular brine value, between the first set of one or more bit groups and the second set of one or more bit groups.

8. The method of claim 7, wherein the boundary value test tests whether a value represented by bits is a maximum number representable by the bits.

9. The method of claim 1, wherein creating the collection of PRNGs is performed by at least two threads of a processor running respective PRNG generators, which use the same salt value, in parallel.

10. The method of claim 1, wherein each PRNG, of the collection of PRNGs, utilizes an xorshift generator algorithm of a group of xorshift generator algorithms comprising: xoroshiro64; xoroshiro128; xoshiro256; xoshiro512; and xoroshiro1024.

11. The method of claim 1, further comprising:
receiving a request to create a second collection of PRNGs;
in response to receiving the request to create a second collection of PRNGs, creating the second collection of PRNGs by:
  generating a second salt value comprising a second pseudorandom number,
  wherein the second pseudorandom number is different from the first pseudorandom number, and
  creating each PRNG of the second collection of PRNGs based on a PRNG-specific brine value that comprises both (a) at least a portion of the second salt value and (b) an index value that is unique to said each PRNG within the second collection of PRNGs.

12. One or more non-transitory computer-readable media storing instructions that, when executed by one or more processors, cause:
generating a salt value comprising a first pseudorandom number;
creating each pseudorandom number generator (PRNG) of a collection of PRNGs based on a PRNG-specific brine value that comprises both (a) at least a portion of the salt value and (b) an index value that is unique to said each PRNG within the collection of PRNGs; and
causing two or more PRNGs, of the collection of PRNGs, to produce pseudorandom numbers in parallel by running the two or more PRNGs on respective two or more threads of a multi-threaded processor.

13. The one or more non-transitory computer-readable media of claim 12, wherein the instructions further comprise instructions that, when executed by one or more processors, cause:
receiving a request for a particular PRNG, of the collection of PRNGs, to generate a pseudorandom number;
wherein the particular PRNG was created based on a particular brine value;
in response to receiving the request for the particular PRNG to generate a pseudorandom number, the particular PRNG utilizing at least a portion of the particular brine value to generate a pseudorandom number; and the particular PRNG returning the generated pseudorandom number as a response to the request to generate a pseudorandom number.

14. The one or more non-transitory computer-readable media of claim 12, wherein creating each PRNG of the collection of PRNGs based on a PRNG-specific brine value comprises creating a particular PRNG based on a particular brine value by causing an additive parameter for the particular PRNG to comprise at least part of the particular brine value.

15. The one or more non-transitory computer-readable media of claim 12, wherein:

creating each PRNG of the collection of PRNGs based on a PRNG-specific brine value comprises creating a particular PRNG based on a particular brine value that comprises a particular portion of the salt value and a particular index value that is unique to the particular PRNG;

the instructions further comprise instructions that, when executed by one or more processors, cause generating the particular brine value by:

determining a number of bits, wherein a set of bits that comprises the determined number of bits is capable of representing at least a known cardinality of the collection of PRNGs, populating a first set of bits in a representation of the particular brine value with the particular portion of the salt value, and populating a second set of bits in the representation of the particular brine value with the particular index value, wherein the number of bits in the second set of bits is the determined number of bits.

16. The one or more non-transitory computer-readable media of claim 12, wherein:

creating each PRNG of the collection of PRNGs based on a PRNG-specific brine value comprises creating a particular PRNG based on a particular brine value that comprises a particular portion of the salt value and a particular index value that is unique to the particular PRNG;

wherein the instructions further comprise instructions that, when executed by one or more processors, cause generating the particular brine value by:

populating a first set of bits, in a representation of the particular brine value, with a sliding boundary index value, wherein the number of the first set of bits is pre-determined, wherein the sliding boundary index value identifies a particular bit in the representation of the particular brine value, populating a second set of bits, a boundary of which is the particular bit in the representation of the particular brine value, with the particular index value, and populating a third set of bits, comprising bits of the representation of the particular brine value that are not in the first set of bits and also not in the second set of bits, with the particular portion of the salt value.

17. The one or more non-transitory computer-readable media of claim 12, wherein:

creating each PRNG of the collection of PRNGs based on a PRNG-specific brine value comprises creating a particular PRNG based on a particular brine value that comprises a particular portion of the salt value and a particular index value that is unique to the particular PRNG;

wherein the instructions further comprise instructions that, when executed by one or more processors, cause generating the particular brine value by:

setting a flag bit of each bit group, of one or more first bit groups in a representation of the particular brine value, to indicate that said each bit group includes salt value information, wherein the one or more first bit groups collectively represent the particular portion of the salt value, and setting an index flag bit, of one or more second bit groups in the representation of the particular brine value, to indicate a boundary bit for the particular index value, wherein the one or more second bit groups collectively represent the particular index value.

18. The one or more non-transitory computer-readable media of claim 12, wherein:

creating each PRNG of the collection of PRNGs based on a PRNG-specific brine value comprises creating a particular PRNG based on a particular brine value that comprises a particular portion of the salt value and a particular index value that is unique to the particular PRNG;

wherein the instructions further comprise instructions that, when executed by one or more processors, cause generating the particular brine value by:

populating a first set of one or more bit groups, in a representation of the particular brine value, with the particular portion of the salt value, wherein each bit group, of the first set of one or more bit groups, represents a value that does not satisfy a boundary value test, populating a boundary bit group, in the representation of the particular brine value, with a value that satisfies the boundary value test, and populating a second set of one or more bit groups, in the representation of the particular brine value, with the particular index value, wherein the boundary bit group is located, in the representation of the particular brine value, between the first set of one or more bit groups and the second set of one or more bit groups.

19. The one or more non-transitory computer-readable media of claim 18, wherein the boundary value test tests whether a value represented by bits is a maximum number representable by the bits.

20. The one or more non-transitory computer-readable media of claim 12, wherein creating the collection of PRNGs is performed by at least two threads of a processor running respective PRNG generators, which use the same salt value, in parallel.

21. The one or more non-transitory computer-readable media of claim 12, wherein each PRNG, of the collection of PRNGs, utilizes an xorshift generator algorithm of a group of xorshift generator algorithms comprising: xoroshiro64; xoroshiro128; xoshiro256; xoshiro512; and xoroshiro1024.

22. The one or more non-transitory computer-readable media of claim 12, wherein the instructions further comprise instructions that, when executed by one or more processors, cause:

receiving a request to create a second collection of PRNGs;

in response to receiving the request to create a second collection of PRNGs, creating the second collection of PRNGs by:
  generating a second salt value comprising a second pseudorandom number,
  wherein the second pseudorandom number is different from the first pseudorandom number, and
  creating each PRNG of the second collection of PRNGs based on a PRNG-specific brine value that comprises both (a) at least a portion of the second salt value and (b) an index value that is unique to said each PRNG within the second collection of PRNGs.

* * * * *

UNITED STATES PATENT AND TRADEMARK OFFICE
CERTIFICATE OF CORRECTION

| | |
|---|---|
| PATENT NO. | : 11,392,350 B2 |
| APPLICATION NO. | : 16/548076 |
| DATED | : July 19, 2022 |
| INVENTOR(S) | : Guy L. Steele, Jr. |

It is certified that error appears in the above-identified patent and that said Letters Patent is hereby corrected as shown below:

On the Title Page

On page 2, Column 1, Item (56) under Other Publications, Line 11, delete "Hasing"," and insert -- Hashing", --, therefor.

On page 2, Column 2, Item (56) under Other Publications, Line 22, delete "perfomance" and insert -- performance --, therefor.

On page 2, Column 2, Item (56) under Other Publications, Line 43, delete "Orgnization" and insert -- Organization --, therefor.

On page 2, Column 2, Item (56) under Other Publications, Line 60, delete "Adviosry" and insert -- Advisory --, therefor.

In the Drawings

On sheet 3 of 3, in FIG. 3, under Reference Numeral 330, Line 1, delete "( VMM)" and insert -- (VMM) --, therefor.

In the Specification

In Column 15, Line 15, delete "that that" and insert -- that --, therefor.

In Column 17, Line 25, delete "the a" and insert -- a --, therefor.

In Column 17, Line 31, delete "the a" and insert -- a --, therefor.

In the Claims

In Column 26, Line 31, in Claim 1, delete "(PRNG" and insert -- (PRNG) --, therefor.

Signed and Sealed this
Twenty-seventh Day of December, 2022

Katherine Kelly Vidal
*Director of the United States Patent and Trademark Office*